US008886265B2

(12) United States Patent
Rofougaran

(10) Patent No.: US 8,886,265 B2
(45) Date of Patent: *Nov. 11, 2014

(54) METHOD AND SYSTEM FOR SHARING ANTENNAS FOR HIGH FREQUENCY AND LOW FREQUENCY APPLICATIONS

(71) Applicant: Broadcom Corporation, Irvine, CA (US)

(72) Inventor: Ahmadreza Rofougaran, Newport Coast, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/034,371

(22) Filed: Sep. 23, 2013

(65) Prior Publication Data
US 2014/0073264 A1 Mar. 13, 2014

Related U.S. Application Data

(63) Continuation of application No. 11/954,345, filed on Dec. 12, 2007, now Pat. No. 8,583,197.

(51) Int. Cl.
H04M 1/00 (2006.01)
H04B 1/00 (2006.01)
H01Q 5/00 (2006.01)
H01Q 21/30 (2006.01)

(52) U.S. Cl.
CPC ............ *H04B 1/0064* (2013.01); *H01Q 5/0034* (2013.01); *H01Q 21/30* (2013.01); *H01Q 5/00* (2013.01)
USPC ....................................................... 455/575.7

(58) Field of Classification Search
CPC ...... H04W 40/06; H04W 16/10; H04W 28/26; H04W 72/02
See application file for complete search history.

(56) References Cited

U.S. PATENT DOCUMENTS

2005/0009472 A1 1/2005 Shamsaifar
2005/0085237 A1 4/2005 Yang et al.

OTHER PUBLICATIONS

Taiwanese Office Action in corresponding application No. 97148583, dated Aug. 19, 2013.

*Primary Examiner* — Patrick Edouard
*Assistant Examiner* — Shantell L Heiber
(74) *Attorney, Agent, or Firm* — Oblon, Spivak, McClelland, Maier & Neustadt, L.L.P.

(57) ABSTRACT

Aspects of a method and system for sharing antennas for high frequency and low frequency applications may include configuring a multi-frequency antenna system by coupling a plurality of antennas together communicatively via one or more frequency-dependent coupling elements. Radio signals may be received and/or transmitted on one or more radio frequencies via said configured multi-frequency antenna system. The one or more frequency-dependent coupling elements may be frequency-tunable, and may comprise microstrips, transmission lines, and/or RLC circuits. The multi-frequency antenna system may be configured for concurrent operation or time-division duplex operation during the transmitting and/or the receiving. The one or more radio frequencies may operate concurrently or in time-division duplex. The radio signals for transmission may be generated in one or more radio frequency front-ends, and the received radio signals may be demodulated in one or more radio frequency front-ends.

20 Claims, 3 Drawing Sheets

METHOD AND SYSTEM FOR SHARING ANTENNAS FOR HIGH FREQUENCY AND LOW FREQUENCY APPLICATIONS

CROSS-REFERENCE TO RELATED APPLICATIONS/INCORPORATION BY REFERENCE

The present application is a Continuation of U.S. application Ser. No. 11/954,345, filed Dec. 12, 2007.

FIELD OF THE INVENTION

Certain embodiments of the invention relate to signal processing for communication systems. More specifically, certain embodiments of the invention relate to a method and system for sharing antennas for high frequency and low frequency applications.

BACKGROUND OF THE INVENTION

Electronic communication has become prolific over the last decade. While electronic communication was initially limited to the desktop, recent trends have been to make communications, media content and the Internet available anytime, anywhere and, increasingly, on any device. Already now, it is quite common to find mobile devices such as cellular phones or Personal Digital Assistants (PDAs) that incorporate a large range of communication technologies and associated software. For example, fully-featured web-browsers, email clients, MP3 players, instant messenger software, and Voice-over-IP may all be found on some recent devices.

To support many different communication standards and data formats, it is desirable to use efficient signal processing, operated at various transmission and reception bands.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A method and/or system for sharing antennas for high frequency and low frequency applications, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for sharing antennas for high frequency and low frequency applications. Aspects of a method and system for sharing antennas for high frequency and low frequency applications may comprise configuring a multi-frequency antenna system by coupling a plurality of antennas together communicatively via one or more frequency-dependent coupling elements. Radio signals may be received and/or transmitted on one or more radio frequencies via said configured multi-frequency antenna system. The one or more frequency-dependent coupling elements may be frequency-tunable, and may comprise microstrips, transmission lines, and/or RLC circuits. The multi-frequency antenna system may be configured for concurrent operation or time-division duplex operation during the transmitting and/or the receiving. The one or more radio frequencies may operate concurrently or in time-division duplex. The radio signals for transmission may be generated in one or more radio frequency front-ends, and the received radio signals may be demodulated in one or more radio frequency front-ends. Received radio frequency (RF) signals may be converted to intermediate frequency (IF) signals and/or to baseband signals during said demodulation.

Figure 1:
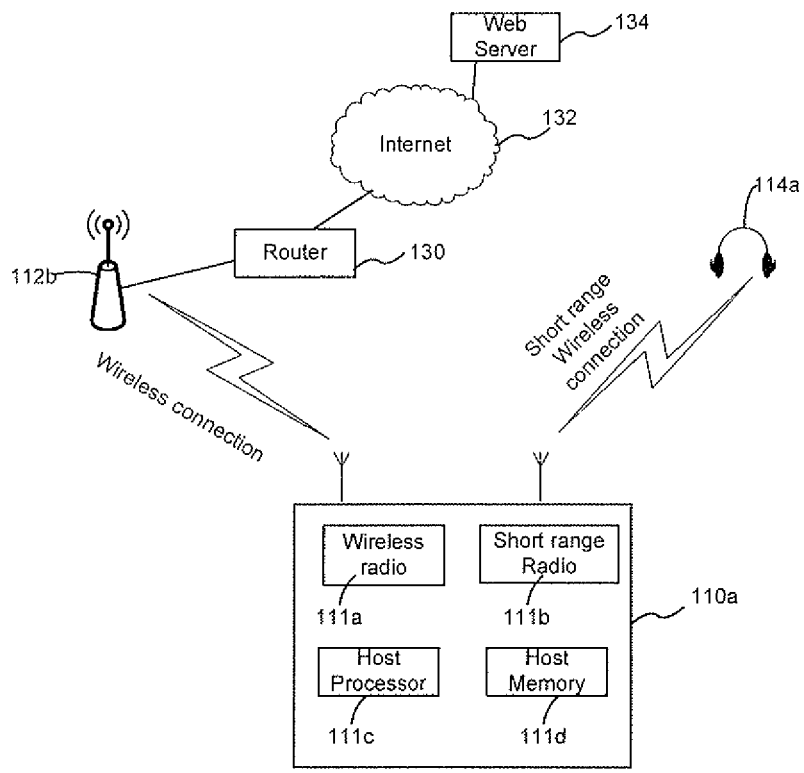
FIG. 1 is a diagram illustrating an exemplary wireless communication system that may be utilized for high frequency and low frequency applications, in accordance with an embodiment of the invention.

FIG. 1 is a diagram illustrating an exemplary wireless communication system that may be utilized for high frequency and low frequency applications, in accordance with an embodiment of the invention. Referring to FIG. 1, there is shown an access point 112b, a computer 110a, a headset 114a, a router 130, the Internet 132 and a web server 134. The computer or host device 110a may comprise a wireless radio 111a, a short-range radio 111b, a host processor 111c, and a host memory 111d. There is also shown a wireless connection between the wireless radio 111a and the access point 112b, and a short-range wireless connection between the short-range radio 111b and the headset 114a.

The access point 112b may comprise suitable logic, circuitry and/or code that may be enabled to transmit and receive radio frequency signals for data communications, for example with the wireless radio 111a. The access point 112b may also be enabled to communicate via a wired network, for example, with the router 130.

The wireless radio 111a may comprise suitable logic, circuitry and/or code that may enable communications over radio frequency waves with one or more other radio communication devices. The wireless radio 111a and the access point 112b may be compliant with one or more mobile communication standard, for example, GSM, UMTS, or CDMA2000. The short range radio 111b may comprise suitable logic, circuitry and/or code that may enable communications over radio frequencies with one or more other communication devices, for example the headset 114a. The short range radio 111b and/or the headset 114a may be compliant with a wireless industry standard, for example Bluetooth, or IEEE 802.11 Wireless LAN. The host processor 111c may comprise suitable logic, circuitry and/or code that may be enabled to generate and process data. The host memory 111d may comprise suitable logic, circuitry and/or code that may be enabled to store and retrieve data for various components and functions of the computer 110a. The router 130 may comprise suitable logic, circuitry and/or code that may be enabled to communicate with communication devices that may be communicatively coupled to it, for example access point 112b or the Internet 132. The Internet 132 may comprise suitable logic, circuitry and/or code that may be enabled to interconnect and exchange data between a plurality of communication devices. The web server 134 may comprise suitable logic, circuitry and/or code that may be enabled to communicate with communication devices that may be communicatively coupled to it, for example the Internet 132.

Frequently, computing and communication devices may comprise hardware and software that may enable communication using multiple wireless communication standards and/or protocols. There may be instances when the wireless radio 111a and the short-range radio 111b may be active concurrently. For example, it may be desirable for a user of the computer or host device 110a to access the Internet 132 in order to consume streaming content from the Web server 134. Accordingly, the user may establish a wireless connection between the computer 110a and the access point 112b. Once this connection is established, the streaming content from the Web server 134 may be received via the router 130, the access point 112b, and the wireless connection, and consumed by the computer or host device 110a.

It may be further desirable for the user of the computer 110a to listen to an audio portion of the streaming content on the headset 114a. Accordingly, the user of the computer 110a may establish a short-range wireless connection with the headset 114a. Once the short-range wireless connection is established, and with suitable configurations on the computer enabled, the audio portion of the streaming content may be consumed by the headset 114a. In instances where such advanced communication systems are integrated or located within the host device 110a, the radio frequency (RF) generation may support fast-switching to enable support of multiple communication standards and/or advanced wideband systems like, for example, Ultrawideband (UWB) radio. The different communication standards that may be utilized in the host device 110a may operate at different frequencies and in some instances it may be desirable to operate different RF circuitry for each communications standard for performance reasons.

Figure 2:
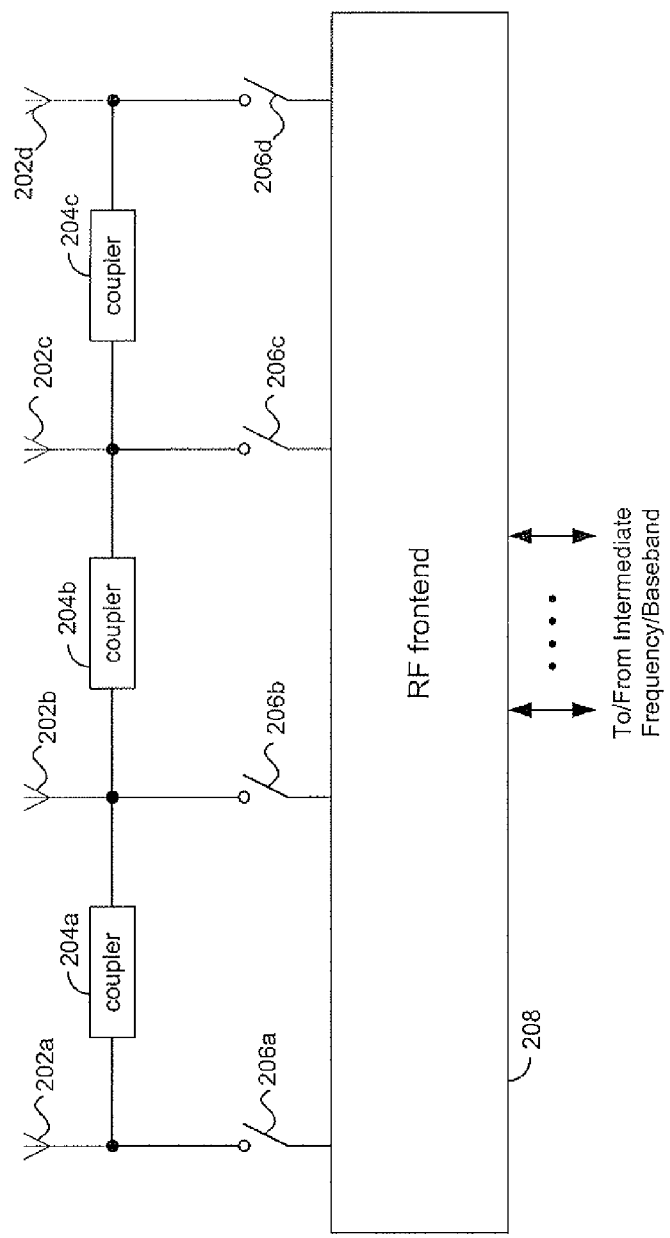
FIG. 2 is a diagram of an exemplary antenna coupling system, in accordance with an embodiment of the invention.

FIG. 2 is a diagram of an exemplary antenna coupling system, in accordance with an embodiment of the invention. Referring to FIG. 2, there is shown a plurality of antennas 202a, 202b, 202c, and 202d, a plurality of antenna couplers 204a, 204b, and 206c, a plurality of switches 206a, 206b, 206c, and 206d, and a radio-frequency (RF) front-end 208.

The plurality of antennas 202a, . . . , 202d may comprise suitable logic, circuitry and/or code that may be enabled to receive and transmit radio frequency signals in a range of frequencies around a center frequency, where the center frequency may be a frequency to which the antennas may be tuned. In accordance with various embodiments of the invention, the plurality of antennas may comprise an arbitrary number of antennas in arbitrary antenna configurations. For example, the plurality of antennas, of which antennas 202a, . . . , 202d may be depicted, may be arranged in a linear array, as illustrated in FIG. 2. In another embodiment of the invention, the antennas may be arranged in a circular array, for example. The plurality of antennas 202a, , 202d may comprise antennas of any type. For example, the plurality of antennas 202a, , 202d may comprise, for example, dipoles or coil antennas that may be discrete elements and/or integrated in a semiconductor product. The types of antennas that may be employed for the plurality of antennas of which antennas 202a, . . . , 202d may be illustrated, may not be limited to any particular type of antenna. One or more of the plurality of antennas, for example antenna 202a, . . . , antenna 202d may be communicatively coupled to the RF front-end 208 via the switches 206a, . . . , 206d, respectively.

The RF front-end 208 may comprise suitable logic, circuitry and/or code that may be enabled to generate RF signals for transmission, and process RF signals received. The RF signals that may be received at the RF front-end 208 via the antennas 202a, . . . , 202d, may be demodulated to intermediate frequency and/or baseband, for further processing. In transmission mode, the RF front-end 208 may generate RF signals from baseband signals and/or intermediate frequency signals that may be suitable for transmission via the antennas 202a, . . . , 202d, for example.

The switches 206a, . . . , 206d may comprise suitable logic, circuitry and/or code that may be configured to enable or disable coupling of an antenna with the RF front-end 208. In some instances, the plurality of switches, of which switches 206a, . . . , 206d may be illustrated, may be frequency selective circuits that may be opened or closed as a function of the frequency. In some instances, the switches 206a, . . . , 206d, for example, may be microstrips.

A plurality of antennas may be communicatively coupled to other antenna via couplers. For example, antenna 202a may be communicatively coupled to antenna 202b via the coupler 204a. The coupler 204a may comprise suitable logic, circuitry and/or code that may be enabled to function as a frequency-dependent switch. A frequency-dependent switch may act like a closed switch for signal at some frequencies and like an open switch for signals at some other frequencies. The couplers 204b and 204c may be substantially similar to the coupler 204a. For example, the couplers 204a, 204b, and 204c may be acting like a closed switch for certain input frequencies and like an open switch for certain different frequencies. In various exemplary embodiments of the invention, the couplers 204a through 204c may be microstrips, transmission lines, or RLC circuits. In accordance with another embodiment of the invention, the couplers, for example couplers 204a, . . . , 204c may be variable and may be tuned.

As illustrated in FIG. 2, a plurality of antennas 202a, . . . , 202d may be communicatively coupled via couplers 204a, 204b, and 204c. Because the couplers, for example, couplers 204a, . . . , 204c may be frequency-dependent switches, at frequencies where the couplers may behave like closed switches, a plurality of antennas may be electrically coupled together. For example, in accordance with an embodiment of the invention, the couplers 204a through 204c may behave like a closed switch around a certain frequency $f_1$. In this instance, the antennas 202a through 202d may be electrically coupled, for example, in parallel. This may create a new effective antenna, since the electric length of the combined antennas may be different from each antenna separately. Based on the frequencies to which each individual antenna may be tuned, a combination of antennas may behave like a single antenna that may be tuned to a different frequency.

In accordance with an exemplary embodiment of the invention, in a multi-frequency, multi-standard system, each antenna, antennas 202a through 202d may be tuned to a high frequency, for example 60 GHz. By suitably combining a plurality of antennas via one or more couplers, for example couplers 204a through 204c, the antenna combination may operate or function like an antenna at a lower frequency, for example suitable for signals in the 5 GHz band. In addition, at frequencies where the couplers 204a through 204d may be operating or functioning like closed switches, for example the switches 206b, 206c and 206d may be opened. When the antennas 202a through 202d may act like a single antenna for a given frequency, it may be desirable to utilize only a single input/output from the RF frontend 208. In some instances, it may be desirable to operate the antenna at multiple frequencies concurrently. In some instances, it may be desirable to operate transmission and reception concurrently or in time-division duplex mode. For example, the coupler 204a, 204b, and 204c may be open-circuit for 60 GHz communication frequencies and closed-circuit for 5 GHz frequencies. Conversely, in accordance with an exemplary embodiment of the invention, the switches 206b, . . . , 206d may be frequency-dependent switches and may be open-circuit for 5 GHz signals, and closed-circuit for 60 GHz signals. The switch 206 may be enabled for both 5 GHz frequencies and 60 GHz frequencies. In accordance with an exemplary embodiment of the invention, the above configuration may permit separate 60 GHz to be communicatively coupled to antennas 202a, 202b, 202c, and 202d from the RF front-end 208 via the switches 206a, 206b, 206c, and 206d, respectively. Concurrently, a 5 GHz signal may be communicatively coupled from the RF front-end 208 to the antenna created by coupling antennas 202a, . . . , 202d in parallel, via the switch 206a. Hence, for 60 GHz signals, the RF front-end 208 may be used with a plurality of separate antennas that may be controlled individually, for example to achieve beamforming. For 5 GHz signals, for example, the antennas 202a, . . . , 202d may be coupled in parallel to generate a desirable antenna configuration for 5 GHz signals. For 5 GHz signals, since the antennas appear like a single antenna, one RF output from the RF front-end 208 may suffice, for example, via switch 206a.

Figure 3:
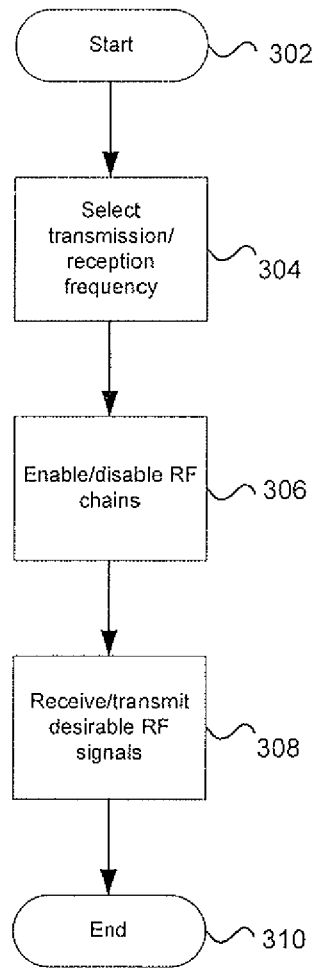
FIG. 3 is a flowchart illustrating an exemplary multi-frequency antennas system.

FIG. 3 is a flowchart illustrating an exemplary multi-frequency antennas system, in accordance with an embodiment of the invention. After initializing the system in step 302, an operating frequency may be selected. The operation frequency may be the frequency for which the antennas, for example the antennas 202a, . . . , 202d may be tuned. The antennas 202a, . . . , 202d may be tuned by changing their electrical length. In accordance with various embodiments of the invention, this may be achieved by communicatively coupling antennas together, by tuning the antennas via RLC circuitry, transmission lines, or multi-tap antennas, for example. Alternatively, the operating frequency may be selected to be a frequency at which a desirable combination of antennas, for example antennas 202a through 202d, coupled via couplers, for example frequency-dependant couplers 204a, 204b, and 204c may achieve a desirable performance. In step 306, the RF chains comprised in the RF frontend, for example RF frontend 208, may be enabled or disabled as desirable, for example through the switches 206a through 206d. When the multi-frequency system, for example as illustrated in FIG. 2 may be set up, RF signals may be received and/or transmitted in step 308.

In accordance with an embodiment of the invention, a method and system for sharing antennas for high frequency and low frequency applications may comprise configuring a multi-frequency antenna system by coupling a plurality of antennas, for example antennas 202a, . . . , 202d together communicatively via one or more frequency-dependent coupling elements, for example couplers 204a, . . . , 204c, as illustrated in FIG. 2. Radio signals may be received and/or transmitted on one or more radio frequencies via said configured multi-frequency antenna system. The one or more frequency-dependent coupling elements, for example 204a, . . . , 204c, may be frequency-tunable, and may comprise microstrips, transmission lines, and/or RLC circuits. As described for FIG. 2, the multi-frequency antenna system may be configured for concurrent operation or time-division duplex operation during the transmitting and/or the receiving. The one or more radio frequencies may operate concurrently or in time-division duplex. The radio signals for transmission may be generated in one or more radio frequency front-ends, for example RF front-end 208, and the received radio signals may be demodulated in one or more radio frequency front-ends, for example RF front-end 208. Received radio frequency (RF) signals may be converted to intermediate frequency (IF) signals and/or to baseband signals during said demodulation.

Another embodiment of the invention may provide a machine-readable storage, having stored thereon, a computer program having at least one code section executable by a machine, thereby causing the machine to perform the steps as described herein for a method and system for sharing antennas for high frequency and low frequency applications.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method comprising:
    communicatively coupling first and second antennas of a plurality of antennas together for operation at a first frequency;
    connecting the first and second antennas of the plurality of antennas to a first radio frequency front-end of a plurality of radio frequency front-ends for operation at the first frequency via one or more of a plurality of switches;
    receiving and/or transmitting radio signals at the first frequency using the first radio frequency front-end and the first and second antennas;
    communicatively coupling third and fourth antennas of the plurality of antennas together for operation at a second frequency;
    connecting the third and fourth antennas of the plurality of antennas to a second radio frequency front-end of the plurality of radio frequency front-ends for operation at the second frequency via at least one switch of the plurality of switches other than the one or more of the plurality of switches; and
    receiving and/or transmitting radio signals at the second frequency using the second radio frequency front-end and the third and fourth antennas;
    wherein at least one of the first and second antennas is a different antenna than the third and fourth antennas.

2. The method of claim 1, wherein the first antenna is the same as the third antenna.

3. The method of claim 1, wherein both the first and second antennas are different antenna than the third and fourth antennas.

4. The method of claim 1, wherein the one or more of the plurality of switches are selected based on the first frequency.

5. The method of claim 1, wherein the one or more of the plurality of switches comprise two or more of the plurality of switches.

6. The method of claim 1, wherein the at least one switch of the plurality of switches is selected based on the second frequency.

7. The method of claim 1, wherein the at least one switch of the plurality of switches comprise two or more of the plurality of switches.

8. The method of claim 1, wherein prior to the communicatively coupling of the first and second antennas, the method further comprises selecting the first frequency, and wherein the first and second antennas are selected based on the first frequency.

9. The method of claim 8, wherein prior to the communicatively coupling of the third and fourth antennas, the method further comprises selecting the second frequency, and wherein the third and fourth antennas are selected based on the second frequency.

10. The method of claim 1, wherein the first frequency is for operation at a longer wireless range than the second frequency.

11. A system comprising:
a plurality of antennas;
a plurality of radio frequency front-ends;
a plurality of switches; and
one or more circuits to enable:
communicatively coupling first and second antennas of the plurality of antennas together for operation at a first frequency;
connecting the first and second antennas of the plurality of antennas to a first radio frequency front-end of the plurality of radio frequency front-ends for operation at the first frequency via one or more of the plurality of switches;
receiving and/or transmitting radio signals at the first frequency using the first radio frequency front-end and the first and second antennas;
communicatively coupling third and fourth antennas of the plurality of antennas together for operation at a second frequency;
connecting the third and fourth antennas of the plurality of antennas to a second radio frequency front-end of the plurality of radio frequency front-ends for operation at the second frequency via at least one switch of the plurality of switches other than the one or more of the plurality of switches; and
receiving and/or transmitting radio signals at the second frequency using the second radio frequency front-end and the third and fourth antennas;
wherein at least one of the first and second antennas is a different antenna than the third and fourth antennas.

12. The system of claim 11, wherein the first antenna is the same as the third antenna.

13. The system of claim 11, wherein both the first and second antennas are different antenna than the third and fourth antennas.

14. The system of claim 11, wherein the one or more of the plurality of switches are selected based on the first frequency.

15. The system of claim 11, wherein the one or more of the plurality of switches comprise two or more of the plurality of switches.

16. The system of claim 11, wherein the at least one switch of the plurality of switches is selected based on the second frequency.

17. The system of claim 11, wherein the at least one switch of the plurality of switches comprise two or more of the plurality of switches.

18. The system of claim 11, wherein prior to the communicatively coupling of the first and second antennas, the one or more circuits further enable selecting the first frequency, and wherein the first and second antennas are selected based on the first frequency.

19. The system of claim 18, wherein prior to the communicatively coupling of the third and fourth antennas, the one or more circuits further enable selecting the second frequency, and wherein the third and fourth antennas are selected based on the second frequency.

20. The system of claim 11, wherein the first frequency is for operation at a longer wireless range than the second frequency.

* * * * *